US008573488B2

(12) United States Patent
Ferrara et al.

(10) Patent No.: US 8,573,488 B2
(45) Date of Patent: *Nov. 5, 2013

(54) CENTRALIZED ISSUER HUB FOR TRANSACTION CARD CUSTOMIZATION

(75) Inventors: Tom Ferrara, Webster Groves, MO (US); Billy Wu, Plano, TX (US); Anna Whelan, Florissant, MO (US); Peter Weinberger, New Fairfield, CT (US)

(73) Assignee: Mastercard International Incorporated, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/606,910

(22) Filed: Sep. 7, 2012

(65) Prior Publication Data

US 2013/0066739 A1 Mar. 14, 2013

Related U.S. Application Data

(63) Continuation of application No. 13/113,694, filed on May 23, 2011, now Pat. No. 8,272,566, which is a continuation of application No. 11/749,697, filed on May 16, 2007, now Pat. No. 7,967,194.

(60) Provisional application No. 60/800,966, filed on May 17, 2006.

(51) Int. Cl.
| *G06K 5/00* | (2006.01) |
| *G06K 19/06* | (2006.01) |
| *G06F 15/12* | (2006.01) |
| *G06F 15/16* | (2006.01) |
| *G06Q 40/00* | (2012.01) |
| *G06Q 30/00* | (2012.01) |

(52) U.S. Cl.
USPC ............ 235/380; 235/432; 235/492; 705/39; 705/26.5; 709/204; 709/208; 709/218

(58) Field of Classification Search
CPC .................................................. G07F 7/1008
USPC ................ 235/380, 432, 379, 492; 709/206; 707/100
See application file for complete search history.

(56) References Cited

U.S. PATENT DOCUMENTS

| 6,134,309 | A * | 10/2000 | Carson ....................... 379/114.2 |
| 6,189,787 | B1 * | 2/2001 | Dorf ............................. 235/380 |
| 6,298,336 | B1 * | 10/2001 | Davis et al. ..................... 705/41 |
| 6,341,724 | B2 * | 1/2002 | Campisano ................... 235/380 |
| 6,375,073 | B1 * | 4/2002 | Aebi et al. ..................... 235/380 |
| 2001/0032878 | A1 * | 10/2001 | Tsiounis et al. .............. 235/379 |
| 2002/0026418 | A1 * | 2/2002 | Koppel et al. ................... 705/41 |
| 2002/0059278 | A1 * | 5/2002 | Bailey et al. ................... 707/100 |
| 2003/0061157 | A1 * | 3/2003 | Hirka et al. ..................... 705/39 |
| 2004/0099731 | A1 * | 5/2004 | Olenick et al. ................ 235/380 |
| 2004/0205138 | A1 * | 10/2004 | Friedman et al. ............. 709/206 |
| 2005/0283430 | A1 * | 12/2005 | Reid et al. ....................... 705/39 |
| 2006/0016875 | A1 * | 1/2006 | Bonalle et al. ................ 235/380 |
| 2008/0010189 | A1 * | 1/2008 | Rosenberger ................... 705/39 |

\* cited by examiner

*Primary Examiner* — Thien T Mai
(74) *Attorney, Agent, or Firm* — Sheppard Mullin Richter & Hampton LLP (57) ABSTRACT

The present invention provides a system for card customization including a centralized issuer hub providing a single point of website integration for applicants in different countries or affiliations, the system comprising a centralized issuer hub comprising a server that coordinates data exchange among a plurality of country- or affiliate-specific websites, a card customization services for processing applicant requests, and an image administrator for customizing applicant submitted images. In operation, a local issuer country website provides a browser-based user interface for an applicant. Card customization services includes a website that recognizes an issuer country or affiliation of the applicant and launches a dedicated country- or affiliate-specific website for the applicant based upon on a country of origin or affiliation of the local issuer country website.

22 Claims, 2 Drawing Sheets

ID STATES PATENT

CENTRALIZED ISSUER HUB FOR TRANSACTION CARD CUSTOMIZATION

REFERENCE TO RELATED APPLICATIONS

This application is a continuation of U.S. patent application Ser. No. 13/113,694, filed May 23, 2011, now U.S. Pat. No. 8,272,566 which is a continuation of U.S. patent application Ser. No. 11/749,697, filed May 16, 2007, now U.S. Pat. No. 7,967,194 which claims the benefit of U.S. Provisional Patent Application No. 60/800,966, filed May 17, 2006, the contents of which are incorporated herein by reference in their entireties.

FIELD OF THE INVENTION

The invention broadly relates to transaction card customization and more particularly to a centralized issuer hub for transaction card customization.

BACKGROUND OF THE INVENTION

Transaction cards, such as credit cards, debit cards, membership cards, promotional cards, frequent flyer cards, and identification cards, are widely used throughout the world. Such transaction cards may include a variety of different indicia to identify the card, the individual using the card, a transaction account (e.g., a transaction card account), and other features. The indicia may include a string of alphanumeric characters, a bar code or an encoded magnetic strip attached to the card. Transaction cards related to financial transactions have a magnetic stripe which runs longitudinally across the face of one side of the card and have a plurality of numbers, expiration date and a name embossed thereon.

It is known to apply a customized image to a membership card, debit card, or other transaction card. Specifically, the customized image may be created and applied to the card from a remote location such as at the applicant's computer, wherein the applicant may edit the customized image using software operated by a website server. However, such methods suffer from a number of known drawbacks. For example, conventional methods for applying customized images to transaction cards require a separate server for every country in which the method is utilized.

SUMMARY OF THE INVENTION

The present invention is directed to a centralized issuer hub for transaction card customization for directing applicants to a dedicated country-specific website.

According to the invention, a preferred system for card customization includes a centralized issuer hub providing a single point of website integration for applicants in different countries to place customized images on their transaction cards. More particularly, the system comprises a centralized issuer hub comprising a server that coordinates data exchange among a plurality of local issuer country websites and a card customization services. An issuer website may be operated using hosted software that the issuer subscribes to, wherein the hosted software resides on the issuer website. In operation, a local issuer country website provides a browser-based user interface for the applicant, and card customization services includes a website that recognizes an issuer country of the applicant and launches a dedicated country-specific website for the applicant based upon on a country of origin of the local issuer country website. In some embodiments, an affiliation-specific website is launched. The system may further comprise an image administrator that is implemented using a computer software application comprising machine readable or interpretable instructions for controlling a remote image processor for approving or rejecting applicant submitted images.

The system of the invention may further comprise a syndication layer that adds country-specific (or affiliation-specific) content to a base website and serves up the dedicated country-specific (or affiliation-specific) website for the applicant. The dedicated issuer country website may be implemented using a proprietary computer software application of the issuer. In addition, the dedicated country-specific or affiliation-specific website is based upon a predetermined language and includes predetermined branding and advertising, wherein the predetermined language, branding and advertising is based upon on the country of origin of the issuer country website. According to some embodiments, the syndication layer further adds brand-specific content to the base website for inclusion in the dedicated country-specific website. The base website includes central features and functionality without any issuer-specific enhancements or branding such as foreign language, colors, artwork and website links. Changes that are applied to base website functionality may be automatically enabled on the dedicated issuer country website.

The centralized issuer hub of the invention is configured to support a single card issuer having a plurality of affiliates or local issuer country websites that may be located in various countries. An affiliate, for example, may comprise a group of banks having the same affiliation within a single corporate entity, or may comprise an affiliation of different banks, credit unions, etc. In this manner, the centralized issuer hub provides a point of integration for a hosted service including the necessary information for each affiliate-specific and/or country-specific version of the software. The software residing on the centralized issuer hub is configured to handle each affiliate-specific and/or country-specific version of the software, while each affiliate- and/or country-specific website includes a slimmer version of the software configured to handle only the affiliate- and/or country-specific version of the software. In some embodiments, card issuers pay a full fee to setup the system for a first country or affiliate, wherein card issuers pay a syndication fee comprising a fraction of the full fee for each additional country or affiliate.

The card customization services website is implemented using a computer software application comprising machine readable or interpretable instructions for manipulation of remote applicant images. The website includes a browser-based user interface displaying a graphical representation of an applicant submitted image that is uploaded by the applicant from a remote location, such that the image may be manipulated by the applicant from the remote location. Image manipulation by the applicant may include image rotating, image re-sizing, image flipping, image mirroring, and image positioning. In operation, the card customization services website mirrors the dedicated country- or affiliate-specific website, sued that system interface branding elements and artwork appear on both websites.

The preferred system of the invention may further comprise an integration point disposed between the centralized issuer hub and the card customization services website, whereby an issuer software application is integrated with a card customization software application, such that the applications function substantially seamlessly as one consistent application. Additionally another integration point may be disposed between the centralized issuer hub and the image administrator, whereby an issuer software application is integrated with an image administrator software application, such that the applications function substantially seamlessly as one consistent application.

According to the invention, a preferred method for providing card customization includes a centralized issuer hub providing a single point of website integration for applicants in different countries. The method comprising the steps of routing an applicant from a local issuer country website (or affiliate website) to a card customization services for processing the applicant's request for a customized card, routing the request to a syndication layer for adding country- and/or affiliate-specific content to a base website, and launching one of a plurality of dedicated country-specific (or affiliate-specific) websites for the applicant based upon on a country of origin of the issuer country website. In some embodiments of the invention, the syndication layer further adds brand-specific content to the base website for inclusion in the dedicated country-specific website. The method may further comprise the steps of displaying at a browser-based user interface a graphical representation of an applicant submitted image, and allowing the applicant to manipulate and customize the selected image using a remote image processor. An additional step may comprise providing an automatic upgrading of all dedicated websites substantially simultaneously.

According to the preferred method, the step of routing the applicant from the local issuer country website to card customization services is performed by the centralized issuer hub, and the steps of routing the request to the syndication layer and launching one of a plurality of dedicated country-specific websites is performed by card customization services. Card customization services may comprise a website that mirrors the dedicated country-specific website, such that system interface branding elements and artwork appear on both websites. The method for providing card customization may further comprise the step of providing an integration point between the centralized issuer hub and card customization services, whereby an issuer software application is integrated with a card customization software application, such that the applications function substantially seamlessly as one consistent application. Additionally, the dedicated country-specific website may be based upon a predetermined language and includes predetermined branding and advertising, wherein the predetermined language, branding and advertising is based upon on the country of origin or affiliation of the issuer country website.

DETAILED DESCRIPTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

The present invention is directed to a process by which a transaction card provider offers a transaction card customization service to a single issuer across multiple countries or affiliates through a single, centralized integration point. In accordance with the principles of the invention, the transaction card customization is provided with local country and/or affiliate branding including, but not limited to: (1) colors: (2) logos; (3) local language; and (4) country-specific legal notices. Although the preferred embodiment of the present invention is described with respect to a transaction card, it should be appreciated that principles described herein may be applied to other transactional cards such as debit cards, ATM cards, membership cards, identification cards and frequent flyer cards, without departing from the scope of the invention.

According to the principles of the invention, custom-designed transaction cards may be provided for both existing and new applicants. Customization may be offered through a country-specific (or affiliation-specific) website for new accounts during the application process or for existing accounts after log-on has occurred. The card customization process enables applicants to customize the front of the card using a dedicated website that is accessed through the issuer's website. Applicants may select personal photos, artwork or any image (subject to image-review standards) for placement on the card. The customization process allows applicants to upload a personal image, refine and design the final look of the card, and submit the final image for image review. The invention is designed to facilitate complete issuer control with minimal impact to the internal acquisition and account maintenance infrastructure. Issuers manage digital images stored on a card customization system, while functional tools available to issuers accommodate image acceptance or rejection for printing subject to predetermined minimum design standards. Upon approval, an image file is created and sent to the issuer. The issuer then formats the print image and applicant account information (e.g., applicant name, account number, and expiration date) into a merged record. A file is created and sent to the issuer's selected card production service provider for printing, personalization and distribution.

Figure 1:
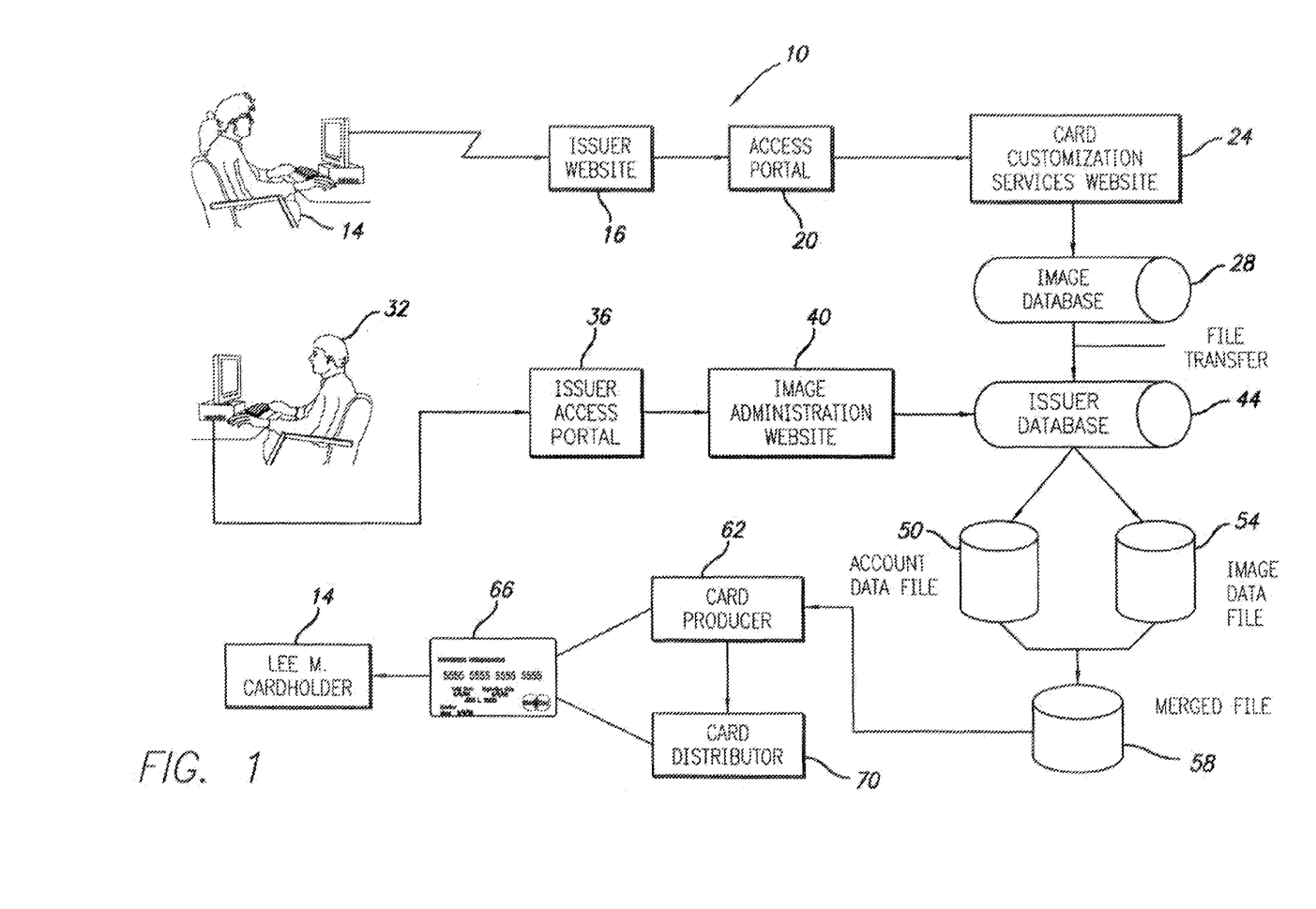
FIG. 1 is a schematic diagram illustrating card customization process flow in accordance with the principles of the present invention.

Referring to FIG. 1, a flowchart 10 is provided illustrating the card customization process flow including custom card image creation, issuer image review, and card production. Initially, an applicant 14 accesses an issuer website 16. Upon entering the appropriate information such as an applicant name and password, the applicant 14 is passed through an access portal 20 to a card customization services website 24 (provided by a transaction card franchiser) for adding a customized image on a front surface of their transaction card. In accordance with the principles of the invention, the customized image is subject to review by the issuer and/or an image administrator of the franchiser.

With further reference to FIG. 1, custom card image creation is performed on the card customization services website 24, whereby the applicant 14 uploads a personal image, creates a custom image and submits the image to the issuer for approval. This information may be stored in a franchiser image database 28 as well as in an issuer database 44. With respect to issuer image review, an issuer 32 may access an online image administrator website 40 via an issuer access portal 36. On the image administrator website 40, the issuer 32 conducts an image review and submits the results including an acceptance or rejection of the image to the issuer database 44. For each applicant 14, an account data file 50 from the issuer database 44 is combined with a corresponding image data file 54 from the issuer database 44 to form a composite merged file 58. With regard to card production, the merged file 58 is sent to a card producer 62 for production and distribution of the customized card 66 to the appropriate applicant 14. The process may optionally involve a card distributor 70, such as a bank or other distributor, for delivering the customized card 66 to the appropriate applicant 14.

Figure 2:
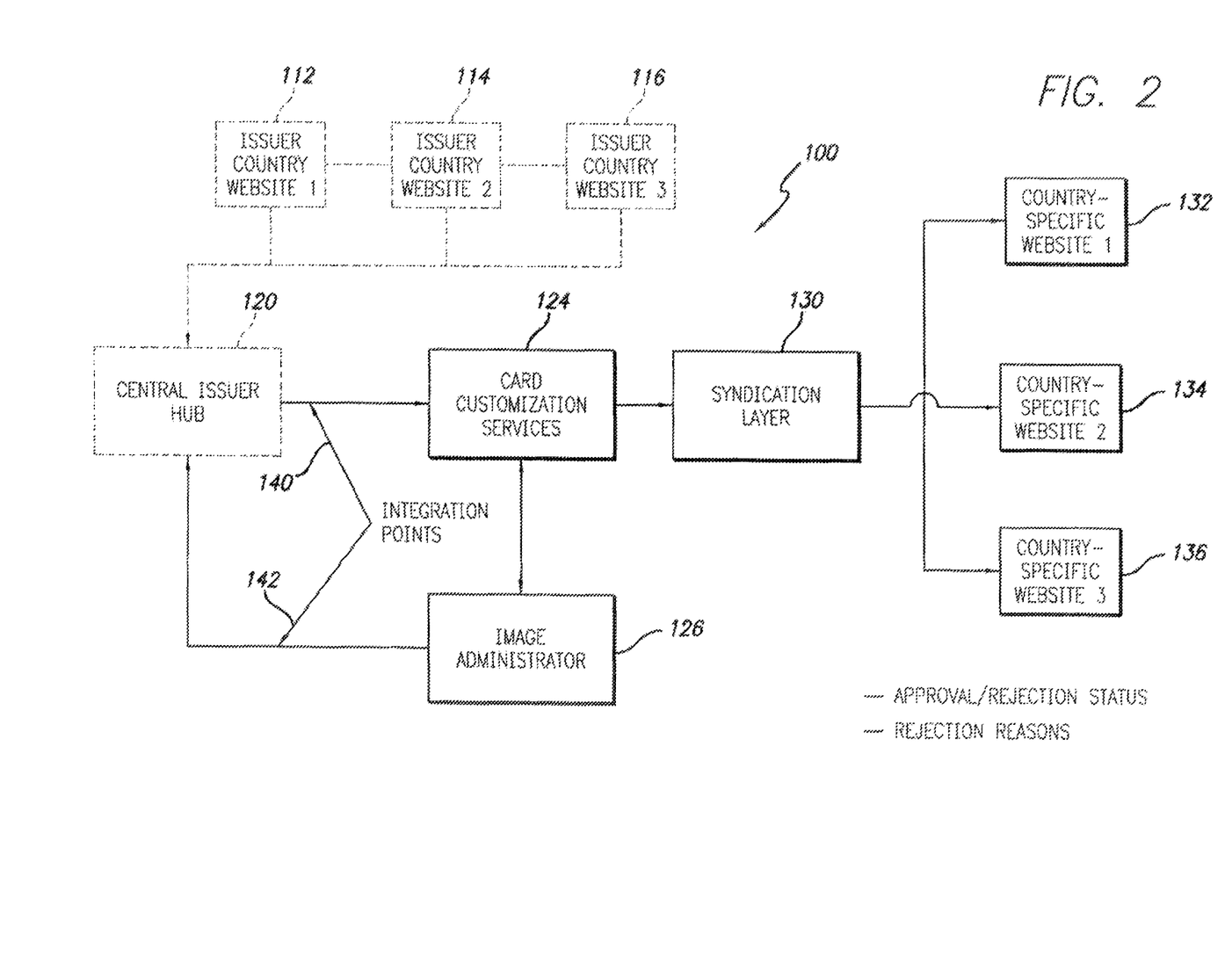
FIG. 2 is a schematic diagram illustrating a preferred system for transaction card customization in accordance with the principles of the present invention.

Referring to FIG. 2, a preferred system 100 for transaction card customization in accordance with the principles of the present invention comprises a plurality of issuer country websites 112, 114, 116, a centralized issuer hub 120, card customization services 124, an image administrator 126, a syndication layer 130, and a plurality of dedicated country-specific websites 132, 134, 136. The system 100 of the invention provides a centralized solution offering a single point of website integration. Applicants may enter the system 100 at a browser-based user interface through their local issuer country website 112, 114, 116. Each local issuer country website 111, 114, 116 may be implemented using its own proprietary computer software application. The image administrator 126 may be implemented using a computer software application comprising machine readable or interpretable instructions for controlling a remote image processor for approving or rejecting various applicant images. After card customization, the system 100 may be employed to route card customization files to one or more card finishers for production.

The centralized issuer hub 120 is also configured to support a card issuer having a plurality of affiliates. By way of example, an affiliate may comprise a group of banks having the same affiliation within a single corporate entity, or may comprise an affiliation of different banks, credit unions, etc. In this manner, the centralized issuer hub 120 provides a point of integration for a hosted service including the necessary information for each affiliate-specific (and/or country-specific) version of the software. The software residing on the centralized issuer hub 120 is configured to handle each affiliate- and/or country-specific version of the software, while each affiliate- and/or country-specific website includes a slimmer version of the software configured to handle only the affiliate- and/or country-specific version of the software.

According to the invention, the centralized issuer hub 120 may comprise a server that coordinates all traffic among the issuer country websites 112, 114, 116 (and/or affiliate websites), the card customization services 124, and the image administrator 126. In this manner, the centralized issuer hub 120 is designed to support a single card issuer with a presence in multiple countries, under multiple brands, and/or having a plurality of affiliates. Through syndication of a semi-customizable template of consumer interface, the integration of the centralized issuer hub 120 and the card customization services application 124 is built once, and syndicated to other countries, for other brands, and/or for different affiliates. Accordingly, a card issuer pays a full fee to setup the system one time and then merely pays a syndication fee (comprising a fraction of the full fee) for the remaining countries, brands or affiliates rather than paying a separate full fee for each country or brand.

Card customization services may comprise a website 124 that recognizes the issuer country and affiliation, and processes applicant requests. In this manner, information provided by the applicant is used to launch a dedicated country- and/or affiliation-specific website 132, 134, 136, whereby the syndication layer 130 adds the correct country-specific, affiliation-specific and/or brand-specific content to a base website and serves up a country-specific version of the base website to the applicant's browser. The base website includes the core components that makeup the consumer-facing card customization software application, wherein the same base code may be reused for all customers. The base website includes basic features and functionality without any issuer-specific enhancements or issuer-specific branding such as foreign language, colors, artwork and website links. After card customization, the system 100 may be employed to route card customization files to one or more card finishers for production.

With further reference to FIG. 2, the card customization services website 124 may be implemented using a computer software application comprising machine readable or interpretable instructions for manipulation of remote images. In particular, the software application may comprise a browser-based user interface displaying a graphical representation of an image that is uploaded by an applicant from a remote location, wherein the image may be manipulated by the applicant from the remote location. By way of example, the original applicant image may be uploaded from the customer's own computer. Regarding image manipulation, the applicant may perform operations such as image rotating, image resizing, image flipping, image mirroring, and image positioning including placing the original image within a window region of the card. According to the invention, the final image displayed on the transaction card may be restricted to a predetermined area on the transaction card, such that the rest of the card may contain features such as logos, holograms and card type indicators.

In operation, the card customization services website 124 preferably mirrors the issuer country website 112, 114, 116. Accordingly, issuers participating in the program coordinate with card customization services to prepare system interface branding elements and artwork that appear on both websites. Elements for such system interface branding may include without limitation: (1) an issuer logo; (2) a link for issuer home in the footer; (3) a link for privacy policy in the footer; (4) a link for "Contact Us" in the footer; (5) terms and conditions; (6) a card customization and tag line; (7) all images on the site; (8) a site language translation (if not English); (9) a color scheme for header, text and buttons; (10) font; (11) frequently asked questions; (12) an approved electronic card form in vector format. In addition, a vector card format file may appear as an "overlay" to provide applicants with a substantially exact replica of the card as it will be received. Accordingly, the overlay preferably shows all account information placement (i.e., "valid thru" date, embossing, issuer logo, etc.) and card attributes (i.e., MIA, engraved areas, etc).

Upon completion of the applicant image submission and return to the appropriate issuer country website 112, 114, 116, card customization information is stored on the issuer country website 112, 114, 116 using a token unique-ID and the image file name. Issuers receive the images and image information from card customization services 124 for storage after receiving custom card image approval or rejection. For example, card customization services 124 may create a zip file of card images for transmission to the issuer. The zip file may contain one or more image files created using an image ID as the filename and a comma separated value (CSV) file having fields including, but not limited to (i) image ID, (ii) date created, (iii) status date (last action date), (iv) status (approved or rejected), (v) reject reason ID (if applicable), and (vi) reject reasons (if applicable).

With further reference to FIG. 2, the system 100 includes one or more integration points 140, 142 wherein the card customization software application interacts with the issuer's software application. More specifically, integration point 140 is disposed between the centralized issuer hub 120 and card customization services 124. At integration point 140, the issuer's software application is integrated with the card customization software application, such that the applications function substantially seamlessly as one consistent application. Another point of integration (integration point 142) is disposed between the centralized issuer hub 120 and the image administrator 126. At integration point 142, the issuer's application software is integrated with the image administrator software application, so that the applications function substantially seamlessly as one consistent application. Particularly, integration point 142 refers to the transfer of approved or rejected image information to the issuer country website 112, 114, 116, so that the appropriate issuer knows which cards to produce, and which cards to pass to their customer service department (e.g., for cards containing rejected images).

In accordance with the principles of the invention, the issuer country websites 112, 114, 116 are the entry point for an applicant to locate their issuer (e.g., the applicant's on-line banking provider). When the applicant is passed to card customization services 124 to complete the customization function, the applicant is served up a dedicated country-specific website 132, 134, 136 for card customization. According to the invention, each dedicated country-specific website 132, 134, 136 may contain its own language, branding, advertising and other qualities, depending on the country of origin of the selected issuer country website 112, 114, 116. Additionally, the preferred system 100 of the invention provides an automatic upgrading of all dedicated websites 132, 134, 136 simultaneously. More particularly, any changes applied to base website functionality may be automatically enabled on each issuer country website 132, 134, 136. Otherwise, the appropriate changes would have to be entered manually with respect to each individual dedicated website 132, 134, 136.

The system 100 of the invention featuring the centralized issuer hub 120 allows integration costs to be lowered significantly. In particular, only one secured link is needed between the centralized issuer hub 120 and the card customization services 124. In addition, only one secured link is needed between the card customization services 124 and a single card producer. In terms of scalability, the only outlay for adding a new issuer country is an incremental branding cost and a link to the centralized issuer hub 120. The system 100 of the invention is also inherently robust and reliable, and requires only limited ongoing maintenance. Specifically, there is only one point of failure since there is only one base website that is altered for various countries. By contrast, with a plurality of base websites, there would be multiple points of failure. With respect to system upgrades, most upgrades require only one point of change.

With further reference to FIG. 2, a preferred method for providing a centralized issuer hub 120 for transaction card customization will now be described. Initially, an applicant at a browser-based user interface on an issuer country website 112, 114, 116 (or affiliate-specific website) clicks on a link to be connected to card customization services, whereby the URL routes the applicant to the centralized issuer hub 120. In the next step, the centralized issuer hub 120 routes the applicant to card customization services 124 for processing the applicant's request The subsequent step involves card customization services 124 sending the request to the syndication layer 130, which adds the correct country-specific (or affiliate-specific) content to the base website and serves up the country-specific version of the base website to the applicant's browser. The next steps comprise displaying at the browser-based user interface a graphical representation of a selected image, and allowing the applicant to manipulate and customize the selected image using a remote image processor. Representative operations performed during card customization include without limitation: rotating, re-sizing, flipping, mirroring, and positioning the image. An additional step of the method may comprise automatically upgrading all dedicated country-specific websites 132, 134, 136 simultaneously, wherein any changes applied to base website functionality are automatically enabled on each country-specific website 132, 134, 136.

Applicant access to the card customization services website 124 is initiated through the issuer country website 112, 114, 116, by creating a message requesting access to the card customization website 124. An issuer created token may required in the header area of the message to identity the issuer as a participant in the program prior to website connection. By way of example, tokens may be created using various data elements including bank name, ICA, returning URL, portfolio and a unique ID. The returning URL data element contains the card customization services web address. The unique ID data element preferably uniquely identifies an applicant and facilitates mapping of the custom card image to the transaction card. Accordingly, each applicant access request should have a unique ID regardless of whether two or more applicants are "linked" to the same account. For example, if a husband and wife are sharing an account (i.e., both applicants are "linked" to the same primary account number) and each submits an access request for a custom card image, a separate unique ID should be created for each submission.

The image administrator 126 disclosed herein is used in the process of image acceptance, rejection and review. Using a predetermined set of image guidelines (such as including a list of prohibited subject matter), an issuer reviewer 315 decides whether to approve or reject the image. To approve an image, an "Approve" button is clicked followed by a "Submit" button, which completes the review/approval process. Rejected images follow the same process except that a "Reject" button is clicked and a series of reject reason descriptors are displayed, wherein all reject reasons that apply are checked. Additionally, the image administrator 126 may include au image archive that stores previously reviewed images. This information is used to provide an historical reference to provide precedence with respect to the types of images that have been approved or rejected. Each stored image may be referenced by the date of approval or rejection, the original date of receipt, the date of initial review and the reasons for rejection.

According to the invention, card issuers are responsible for providing initial image review including the rejection of inappropriate images. Prohibited subject matter for a customized images on any transaction card may include without limitation: (1) sexual subject matter of any nature; (2) political subject matter of any nature (except if the affinity or co-branded partner is a political organization); (3) offensive racial/prejudicial subject matter of any nature; (4) offensive religions subject matter of any nature; (5) advertising of any nature; (6) a portrait of an adult (including the applicant) intended for identification purposes; (7) self-promotion of any nature (e.g., personal business card); (8) copyrighted material of any nature; (9) branded products/services, including abbreviations, acronyms and/or symbols of any nature (except those identities approved for co-branded card programs); (10) solicitations, including telephone numbers or services of any nature (e.g., 900 or 800 numbers); (11) celebrities, musicians, athletes, entertainers, public figures, etc., of any nature; (12) affiliation with groups that are determined to be of a "socially unacceptable" nature; (13) subject matter of any nature that might result in card acceptance confusion by merchants; and (14) subject matter of any nature that might result in card fraud.

The image administrator 126 of the invention provides issuers with various tools for image review. These image administrator tools may be accessed, for example, through an extranet of the franchiser. The applicant portal interface to the card customization services website 124 functions independently from the issuer country websites 112, 114, 116, and therefore only requires the establishment of physical links. The system 100 preferably employs industry functionality standards with respect to application intuitiveness in order to facilitate applicant ease of use. According to some embodiments, applicants must first accept image guidelines and terms and conditions prior to image upload.

According to the invention, applicant access to the card customization services website is initiated through a selected issuer country website by creating a message requesting access to the card customization website. An issuer created token may required in the header area of the message to identify the issuer as a participant in the program prior to website connection. By way of example, tokens may be created using various data elements including bank name, ICA, returning URL, portfolio and a unique ID. The returning URL data element contains the card customization services web address. The unique ID data element uniquely identifies an applicant and facilitates mapping of the custom card image to the transaction card. Accordingly, each applicant access request contains a unique ID regardless of whether two or more applicants are "linked" to the same account. For example, if a husband and wife are sharing an account (i.e., both applicants are "linked" to the same primary account number) and each submits an access request for a custom card image, a separate unique ID is created for each submission.

The browser-based user interface is used to locate a preferred applicant image, select the image and upload the image. Image upload may be from a scanner, internet or any other medium device able to interface with the applicant's computer. Card customization may involve the use of image manipulation functions that allow applicants to rotate, flip, reset or resize the custom image to reflect the exact position the image will appear on the card. Using WYSIWYG ("What You See Is What You Get") technology, the card image shown on the site will be substantially an exact replica of what will appear on the actual issued card. Once the applicant has determined the precise image fit on the card, the design may be previewed prior to submission. If satisfied, the applicant selects a "Submit" button and the confirmation screen appears.

The resulting image files are very large given the amount of pixels each image requires, thus presenting certain challenges with respect to file transfer and storage. Accordingly, operations and systems efforts are coordinated to ensure maximum efficiencies in file processing. Issuers participating in the program may provide information concerning projected system use including the number of card programs to be employed. Additionally, for each program provided, the issuer may provide information including, but not limited to: (1) the number of applicants in the program; (2) the projected percentage of applicant participation in the program; (3) the projected rate of applicant custom image requests (e.g., number of cards per time period); (4) the number of years the program is expected to reach its peak; (5) the timing of planned promotions/advertising that would direct traffic to the site to include the expected increase in traffic resulting from the promotion/advertising; (6) the capacity of the internet connection to the server on which the image file will be received; and (7) the estimated image size (maximum of two megabytes for each image).

Thus, it is seen that a centralized issuer huh for transaction card customization is provided. One skilled in the art will appreciate that the present invention can be practiced by other than the various embodiments and preferred embodiments, which are presented in this description for purposes of illustration and not of limitation, and the present invention is limited only by the claims that follow. It is noted that equivalents for the particular embodiments discussed in this description may practice the invention as well.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The invention claimed is:

1. A system for card customization including a centralized issuer hub providing a single point of website integration for applicants in different countries, the system comprising:
    a centralized issuer hub comprising a server that coordinates data exchange between two or more local issuer country websites, a card customization services for processing applicant requests, and a syndication layer that adds country-specific content to a base website and serves up a dedicated country-specific website for an applicant;
    wherein a local issuer country website provides a browser-based user interface for the applicant;
    wherein the card customization services includes a website that recognizes an issuer country of the applicant and launches the dedicated country-specific website for the applicant based upon on a country of origin of the local issuer country website.

2. The system of claim 1, wherein the syndication layer further adds brand-specific content to the base website for inclusion in the dedicated country-specific website.

3. The system of claim 1, wherein the dedicated issuer country website is implemented using a proprietary computer software application of the issuer.

4. The system of claim 1, further comprising an image administrator that is implemented using a computer software application comprising machine readable or interpretable instructions for controlling a remote image processor for approving or rejecting applicant submitted images.

5. The system of claim 1, wherein the centralized issuer hub is configured to support a single card issuer having a plurality of local issuer country websites in various countries.

6. The system of claim 1, wherein card issuers pay a full fee to setup the system for a first country, wherein card issuers pay a syndication fee comprising a fraction of the full fee for each additional country.

7. The system claim 1, wherein the card customization services website is implemented using a computer software application comprising machine readable or interpretable instructions for manipulation of remote applicant images.

8. The system of claim 1, wherein the card customization services website comprises a browser-based user interface displaying a graphical representation of an applicant submitted image that is uploaded by the applicant from a remote location, such that the image may be manipulated by the applicant from the remote location, and wherein image manipulation by the applicant includes image rotating, image re-sizing, image flipping, image mirroring, and image positioning.

9. The system of claim 1, wherein the card customization services website minors the dedicated country-specific website, such that system interface branding elements and artwork appear on both websites.

10. The system of claim 1, further comprising an integration point disposed between the centralized issuer hub and the card customization services website, whereby an issuer software application is integrated with a card customization software application, such that the applications function substantially seamlessly as one consistent application.

11. The system of claim 4, further comprising an integration point disposed between the centralized issuer hub and the image administrator, whereby an issuer software application is integrated with an image administrator software application, such that the applications function substantially seamlessly as one consistent application.

12. The system of claim 1, wherein the dedicated country-specific website is based upon a predetermined language and includes predetermined branding and advertising, wherein the predetermined language, branding and advertising is based upon on the country of origin of the issuer country website.

13. A method for providing card customization including a centralized issuer hub providing a single point of website integration for applicants in different countries, the method comprising:
    routing an applicant from a local issuer country website to a card customization services for processing the applicant's request for a customized card;
    routing the request to a syndication layer for adding country-specific content to a base website; and
    launching one of a plurality of dedicated country-specific websites for the applicant based upon a country of origin of the issuer country website.

14. The method of claim 13, further comprising displaying at a browser-based user interface a graphical representation of an applicant submitted image, and allowing the applicant to manipulate and customize the selected image using a remote image processor.

15. The method of claim 13, further comprising providing an automatic upgrading of all dedicated websites substantially simultaneously.

16. The method of claim 13, wherein routing the applicant from the local issuer country website to card customization services is performed by the centralized issuer hub, wherein routing the request to the syndication layer is performed by card customization services, and wherein launching one of a plurality of dedicated country-specific websites is performed by card customization services.

17. The method of claim 13, wherein the syndication layer further adds brand-specific content to the base website for inclusion in the dedicated country-specific website.

18. The method of claim 13, wherein the base website includes central features and functionality without any issuer-specific enhancements or branding such as foreign language, colors, artwork and website links.

19. The method of claim 13, wherein the dedicated issuer country website is implemented using a proprietary computer software application of the issuer.

20. The method of claim 13, wherein card customization services includes a website that mirrors the dedicated country-specific website, such that system interface branding elements and artwork appear on both websites.

21. The method of claim 13, further comprising providing an integration point between the centralized issuer hub and card customization services, whereby an issuer software application is integrated with a card customization software application, such that the applications function substantially seamlessly as one consistent application.

22. The method of claim 13, wherein the dedicated country-specific website is based upon a predetermined language and includes predetermined branding and advertising, wherein the predetermined language, branding and advertising is based upon on the country of origin of the issuer country website.

* * * * *

UNITED STATES PATENT AND TRADEMARK OFFICE
CERTIFICATE OF CORRECTION

| | | |
|---|---|---|
| PATENT NO. | : 8,573,488 B2 | Page 1 of 1 |
| APPLICATION NO. | : 13/606910 | |
| DATED | : November 5, 2013 | |
| INVENTOR(S) | : Tom Ferrara et al. | |

It is certified that error appears in the above-identified patent and that said Letters Patent is hereby corrected as shown below:

In the Specification:

Column 2, line 57: "sued" should be -- such --.

Column 4, line 10: "colors:" should be -- colors; --.

Column 5, line 19: "111" should be -- 112 --.

Column 6, line 1: "makeup" should be -- make up --.

Column 7, line 60: "request" should be -- request. --.

Column 8, line 14: "identity" should be -- identify --.

Column 8, line 41: "au" should be -- an --.

Column 8, line 56: "religions" should be -- religious --.

Column 10, line 4: "huh" should be -- hub --.

In the Claims:

Column 12, line 15: "minors" should be -- mirrors --.

Signed and Sealed this
Eleventh Day of February, 2014

Michelle K. Lee
*Deputy Director of the United States Patent and Trademark Office*